United States Patent
Hohnstadt et al.

(10) Patent No.: US 7,225,783 B2
(45) Date of Patent: Jun. 5, 2007

(54) ENGINE MOTION ACTIVE CONTROL

(75) Inventors: Frederick P. Hohnstadt, Clarkston, MI (US); Steven A. Tervo, Howell, MI (US); Eric N. Jacobson, Wixom, MI (US); Brian E. Ferrari, Troy, MI (US); Donald R. Elzinga, Jr., Waterford, MI (US); Eric J. Defenderfer, Brighton, MI (US); Scott Wise, Okemos, MI (US); Wolfgang Bors, Rockford, MI (US); Borz Fariborzi, Grand Rapids, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/243,518

(22) Filed: Oct. 4, 2005

(65) Prior Publication Data

US 2006/0283416 A1   Dec. 21, 2006

Related U.S. Application Data

(60) Provisional application No. 60/692,432, filed on Jun. 21, 2005.

(51) Int. Cl.
*F02B 75/06* (2006.01)
*F02D 13/06* (2006.01)

(52) U.S. Cl. .................... 123/192.1; 123/198 F (58) Field of Classification Search ............ 123/192.1, 123/198 F
See application file for complete search history.

(56) References Cited

U.S. PATENT DOCUMENTS 5,255,646 A * 10/1993 Inagaki et al. ............ 123/192.1
2005/0049108 A1 * 3/2005 Nishizawa et al. ....... 123/192.1

* cited by examiner

*Primary Examiner*—Noah P. Kamen
(74) *Attorney, Agent, or Firm*—Christopher DeVries

(57) ABSTRACT

An engine active motion control system for controlling engine dynamic torque includes an engine that generates a first dynamic torque. A first module selectively initiates generation of a second dynamic torque about an axis of rotation of a crankshaft of the engine in a direction opposite that of the first dynamic torque generated through the crankshaft.

16 Claims, 6 Drawing Sheets

ENGINE MOTION ACTIVE CONTROL

CROSS-REFERENCE TO RELATED APPLICATIONS

This application claims the benefit of U.S. Provisional Application No. 60/692,432, filed on Jun. 21, 2005. The disclosure of the above application is incorporated herein by reference.

FIELD OF THE INVENTION

The present invention relates to engine noise, vibration and harshness (NVH), and more particularly to active engine block dynamic combustion torque cancellation.

BACKGROUND OF THE INVENTION

Internal combustion engines create drive torque that is transferred to a drivetrain via a crankshaft. The crankshaft torque and engine block dynamic combustion torque are generally equal in amplitude and opposite in direction. Engines are designed to produce a steady-state (DC) torque. Under certain conditions, a dynamic (AC) torque is generated, and can result in noise and vibration that is noticeable by the vehicle occupants.

Some internal combustion engines include engine control systems that deactivate cylinders under low load situations. For example, an eight cylinder engine can be operated using four cylinders to improve fuel economy by reducing pumping losses. This process is generally referred to as displacement on demand or DOD. Operation using all of the engine cylinders is referred to as an activated mode. A deactivated mode refers to operation using less than all of the cylinders of the engine (one or more cylinders not active).

Vehicles are tuned to reduce noise, vibration and harshness (NVH). For example, vibrations are induced in the engine and the remainder of the powertrain as a result of the combustion process. The engine and structures supporting the engine in the vehicle (e.g., engine mounts) are tuned to attenuate this vibration.

In the deactivated mode, there are less cylinders operating. As a result, the vibration frequency is reduced. For example, in an 8-cylinder engine, the vibration frequency resulting from combustion is approximately 80 Hz. When operating in a deactivated mode, only 4-cylinders are firing. As a result, the vibration frequency is cut in half to 40 Hz. The reduced vibration frequency in the deactivated mode can result in an increase in NVH, which may be noticeable by the vehicle operator.

SUMMARY OF THE INVENTION

Accordingly, the present invention provides an engine active motion control system for controlling engine dynamic torque. The engine control system includes an engine that generates a first dynamic torque. A first module selectively initiates generation of a torque about an axis of rotation of a crankshaft of the engine in a direction opposite that of the first dynamic torque generated through the crankshaft.

In other features, the torque is generated based on an engine speed. The torque is generated when the engine speed is greater than a first engine speed threshold and is less than a second engine speed threshold.

In other features, the engine control system further includes a first pair of active mass absorbers (AMAs) that are offset from the axis of rotation and that each generate a force in a direction that is parallel to a plane defined through the axis of rotation to induce the torque. In one arrangement, the AMAs are positioned on opposite sides of the axis of rotation and are offset an equivalent distance from the axis of rotation. In another arrangement, the AMAs are positioned on opposite sides of the axis of rotation, are offset at different distances from the axis of rotation. A force generated by one of the first pair of AMAs is greater than a force generated by another of the first pair of the AMAs.

In still another feature, the engine control system further includes a second pair of AMAs that are offset from the axis of rotation and that each generates a force in a direction that is parallel to a plane defined through the axis of rotation to induce the torque.

In yet another feature, the engine is a displacement on demand engine that is operable in activated and deactivated modes.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, activated refers to operation using all of the engine cylinders. Deactivated refers to operation using less than all of the cylinders of the engine (one or more cylinders not active).

Figures 1, 2:
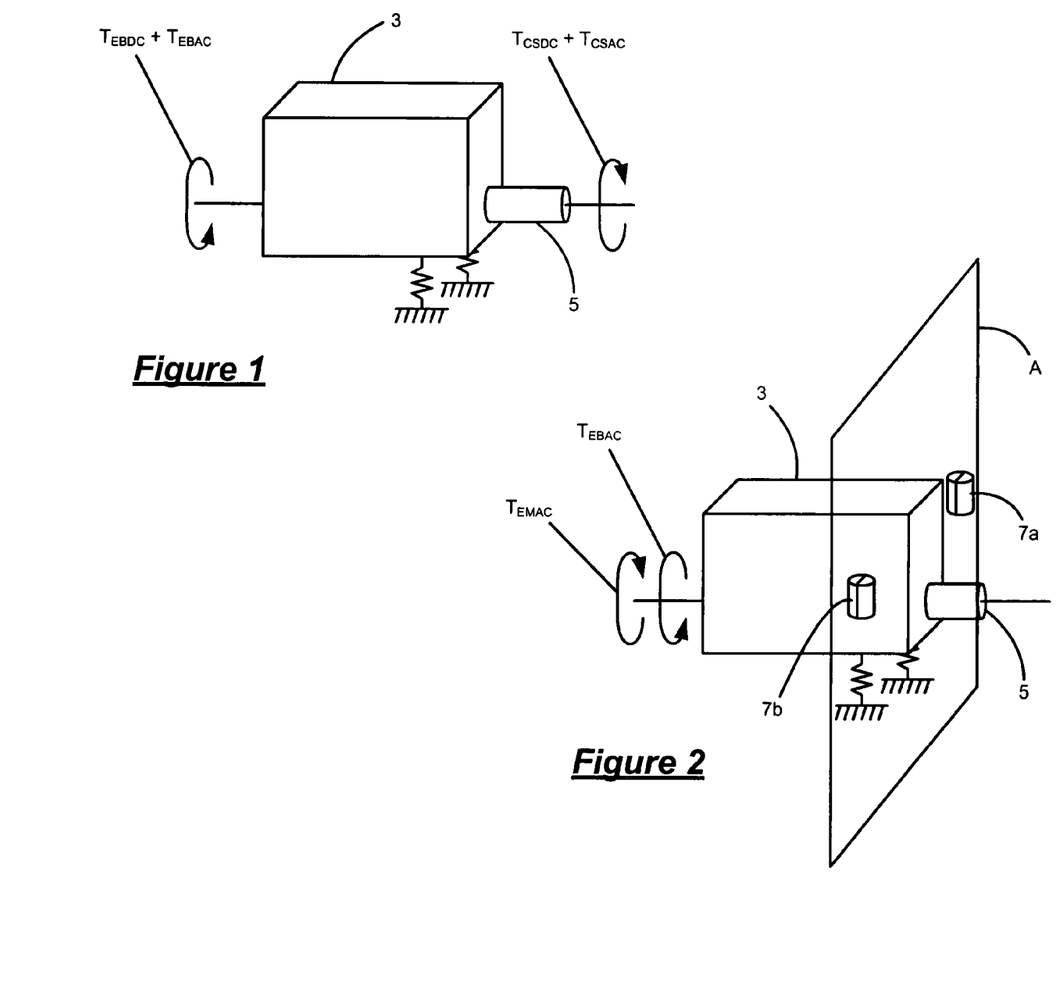
FIG. 1 is a schematic perspective view of an exemplary engine illustrating various torques thereof.
FIG. 2 is a schematic perspective view of the engine including a pair of active mass absorbers (AMAs) in accordance with the present invention.

Referring now to FIG. 1, a schematic engine 3 includes a crankshaft 5. As discussed in further detail below, the engine 3 generates crankshaft torque that includes both a dynamic (AC) torque ($T_{CSAC}$) and a steady-state (DC) torque ($T_{CSDC}$). An engine block dynamic combustion torque ($T_{EBAC}$) and a steady-state torque ($T_{EBDC}$) are also generated. $T_{EBAC}$ is the torque that engine motion active (EMA) control system of the present invention is intended to cancel, as discussed in further detail below.

Figure 3:
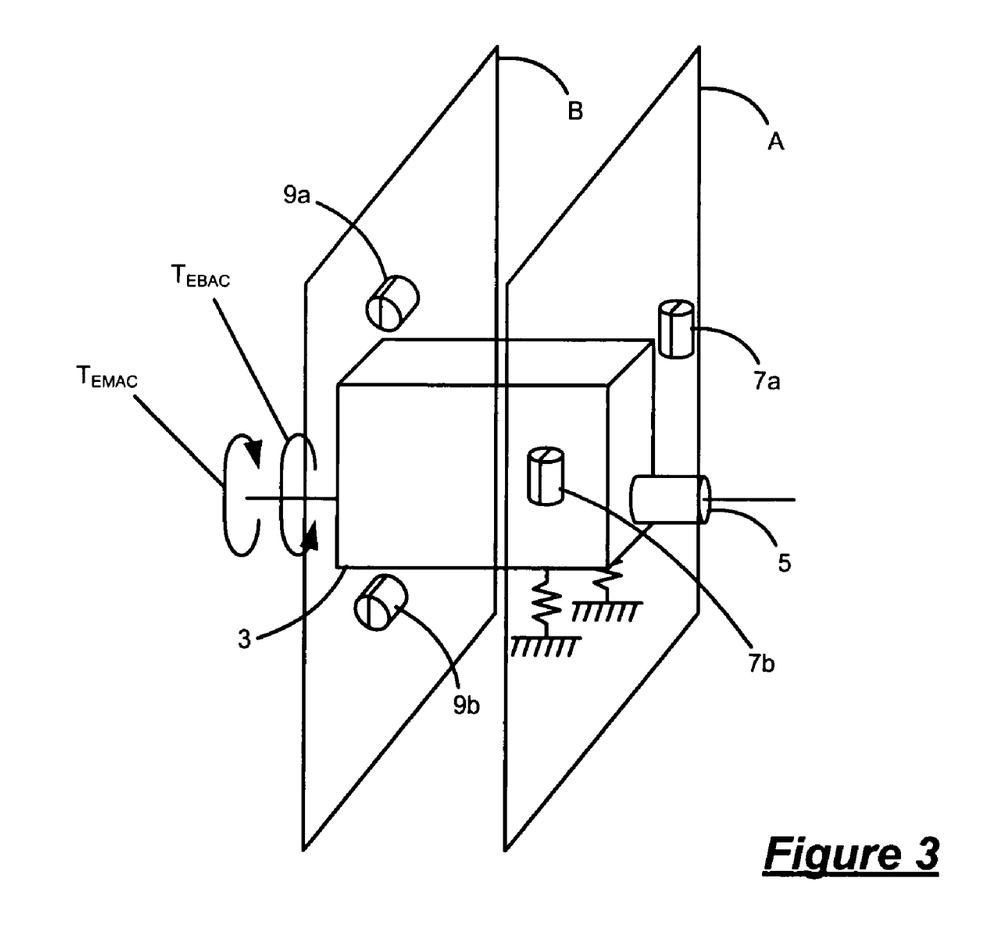
FIG. 3 is a schematic perspective view of the engine including multiple pairs of AMAs in accordance with the present invention.

Referring now to FIGS. 2 and 3, the engine 3 and the crankshaft 5 are shown as illustrated in FIG. 1. A plane A is defined and is perpendicular to the crankshaft 5. A set of active mass absorbers (AMAs) 7a,7b are positioned with their axis located in plane A. The AMAs are explained in further detail below. The axis of AMA 7 is parallel to the axis of AMA 7b. The AMAs 7a,7b are rigidly attached to the engine 3. When energized, the AMAs 7a,7b create a dynamic torque ($T_{AC}$) about the crankshaft axis. The frequency and amplitude of $T_{AC}$ are set to be equal in frequency and amplitude and opposite in phase to $T_{EBAC}$. In this manner, $T_{AC}$ and $T_{EBAC}$ cancel each other out and preferably yield a net zero oscillating torque.

FIG. 3 illustrates an alternate embodiment of the EMA control system with two sets of AMAs 7,9. The first set of AMAs 7a,7b are positioned as described with respect to FIG. 2. A second plane B is defined perpendicular to the crankshaft 5. Two AMA devices 9a,9b are positioned with their axes located on plane B and the axis of AMA 9a is parallel to the axis of AMA 9b. AMAs 9a,9b are rigidly attached to engine 3 and when energized, they create a second dynamic torque ($T'_{AC}$) about the crankshaft 5. The frequency of this torque is set to be equal to the frequency of $T_{EBAC}$. The amplitude of both $T_{AC}$ and $T'_{AC}$ added together will be equal and opposite to the amplitude $T_{EBAC}$. Therefore, the total dynamic torque again yields a net zero torque.

It is noted that the location of the AMAs 7a,7b located in plane A is not dependent the location of the AMA 9a,9b located in plane B. Any number of additional planes can be thus generated perpendicular to the crankshaft 5, with each plane locating an additional AMA set. It is also noted that each AMA set may contain any number of AMA. The AMAs in a set must all lie on a common plane, perpendicular to the crankshaft 5 and the net dynamic torque generated by the AMAs acting in concert is equal to and opposite to $T_{EBAC}$.

Referring now to FIGS. 4 through 7, a specific implementation of the EMA control system of the present invention will be described in detail. More specifically, the EMA control system is described as being implemented with a displacement on demand (DOD) engine. It is appreciated, however, that the EMA control system of the present invention can be implemented with various types of engines including, but not limited to, a traditional internal combustion engine and a DOD engine.

Figure 4:
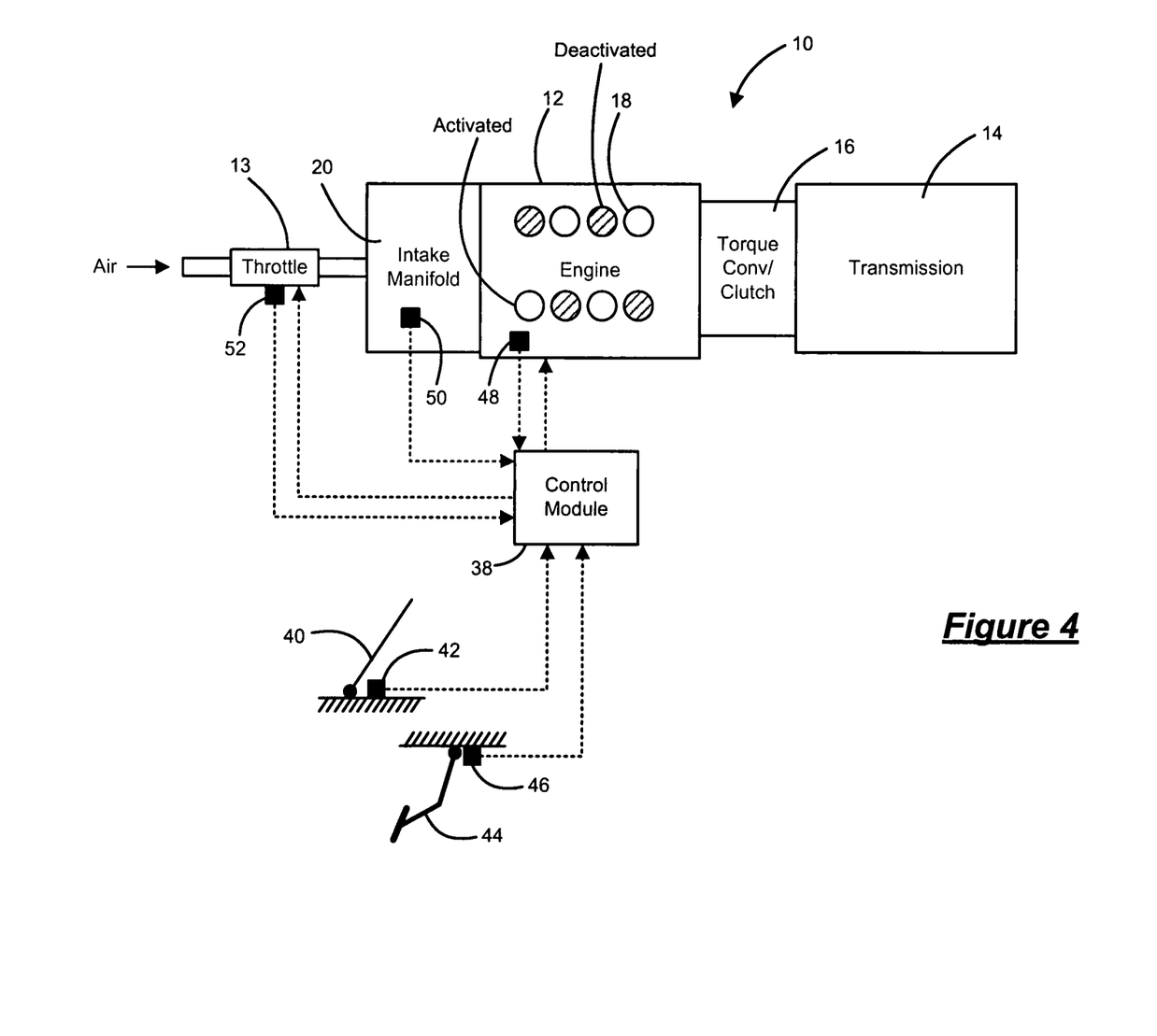
FIG. 4 is a functional block diagram of an exemplary engine system implementing the engine motion active (EMA) control system of the present invention.

Referring now to FIG. 4, a vehicle 10 includes an engine 12 that drives a transmission 14. The transmission 14 is either an automatic or a manual transmission that is driven by the engine 12 through a corresponding torque converter or clutch 16. Air flows into the engine 12 through a throttle 13. The engine 12 includes N cylinders 18. One or more of the cylinders 18 are selectively deactivated during engine operation. Although FIG. 1 depicts eight cylinders (N=8), it is appreciated that the engine 12 may include additional or fewer cylinders 18. For example, engines having 4, 5, 6, 8, 10, 12 and 16 cylinders are contemplated. Air flows into the engine 12 through an intake manifold 20 and is combusted with fuel in the cylinders 18. The combustion process reciprocally drives pistons (not shown) within the cylinders 18. The pistons rotatably drive a crankshaft 30 (see FIGS. 2A and 2B) to provide drive torque to the powertrain.

A control module 38 communicates with the engine 12 and various inputs and sensors as described herein. A vehicle operator manipulates an accelerator pedal 40 to regulate the throttle 13. More particularly, a pedal position sensor 42 generates a pedal position signal that is communicated to the control module 38. The control module 38 generates a throttle control signal based on the pedal position signal. A throttle actuator (not shown) adjusts the throttle 13 based on the throttle control signal to regulate air flow into the engine 12.

The vehicle operator manipulates a brake pedal 44 to regulate vehicle braking. More particularly, a brake position sensor 46 generates a brake pedal position signal that is communicated to the control module 38. The control module 38 generates a brake control signal based on the brake pedal position signal. A brake system (not shown) adjusts vehicle braking based on the brake control signal to regulate vehicle speed. An engine speed sensor 48 generates a signal based on engine speed. An intake manifold absolute pressure (MAP) sensor 50 generates a signal based on a pressure of the intake manifold 20. A throttle position sensor (TPS) 52 generates a signal based on throttle position.

When light engine load occurs, the control module 38 transitions the engine 12 to the deactivated mode. In an exemplary embodiment, N/2 cylinders 18 are deactivated, although one or more cylinders may be deactivated. Upon deactivation of the selected cylinders 18, the control module 38 increases the power output of the remaining or activated cylinders 18. The inlet and exhaust ports (not shown) of the deactivated cylinders 18 are closed to reduce pumping losses.

The engine load is determined based on the intake MAP, cylinder mode and engine speed. More particularly, if the MAP is below a threshold level for a given RPM, the engine load is deemed light and the engine 12 is operated in the deactivated mode. If the MAP is above the threshold level for the given RPM, the engine load is deemed heavy and the engine 12 is operated in the activated mode.

Figure 5A:
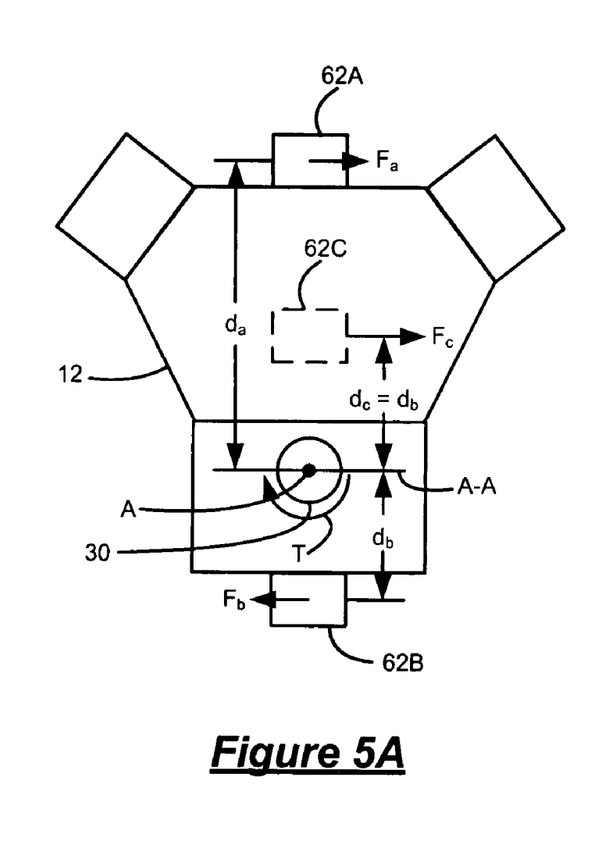
FIG. 5A is a side-view of an engine including an arrangement of AMAs according to the present invention.
Figure 5B:
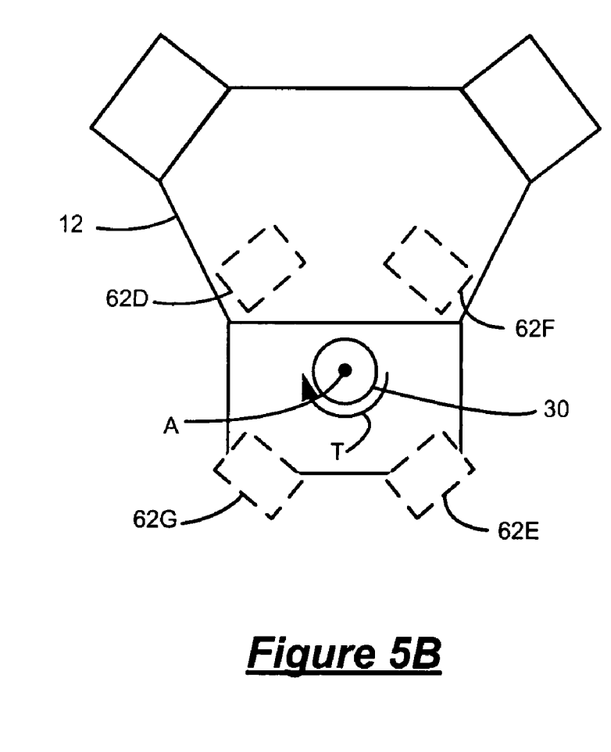
FIG. 5B is a side-view of an engine including an alternative arrangement of AMAs according to the present invention.

Referring now to FIGS. 5A and 5B, the vehicle 10 includes an engine motion active (EMA) control system 60. The EMA control system includes at least a pair of active mass absorbers (AMAs) 62 positioned on opposite sides of the crankshaft 30. Each AMA 62 is an active mass and spring system that induces a linear force (F). Because the AMAs 62 are offset a distance away from an axis of rotation (A) of the crankshaft 30, the AMAs 62 selectively generate a moment or torque about the axis A. More specifically, as described in further detail below, in an ON mode, the AMA's generate a torque in a direction opposite to the direction of rotation of the crankshaft 30. In an OFF mode, the AMAs are inactive and generate no torque about the axis A.

With particular reference to FIG. 5A, a first AMA 62A is offset a distance $d_a$ from the axis A and a second AMA 62B is offset a distance $d_b$ from the axis A. When in the ON mode, the AMA 62A generates a force $F_a$ and the AMA 62B generates a force $F_b$ to provide a resultant torque (T) about the axis A, according to the following relationship:

$$T = F_a d_a + F_b d_b$$

The torque (T) imparted about the axis A is out of phase with the drive torque transmitted through the crankshaft 30. For example, T can be approximately 180° out of phase with the drive torque. In one configuration, each AMA 62A,62B generates half of T, according to the following relationships:

$$F_a d_a = \frac{1}{2}T \text{ and } F_b d_b = \frac{1}{2}T$$

as a result:

$$F_a d_a = F_b d_b$$

and:

$$F_a = F_b(d_b/d_a)$$

Because $d_a$ is greater than $d_b$, $F_b$ is less than $F_a$. Therefore, the AMA 62A is smaller than the AMA 62B. $F_a$ and $F_b$ are in a direction that is parallel to a plane A—A defined through the axis A.

With continued reference to FIG. 5A, and in an alternative configuration, the AMA 62A is replaced with an AMA 62C that is offset a distance $d_c$ from the axis A, whereby $d_c$ is equal to $d_b$. The torque (T) is determined according to the following relationship:

$$T = F_c d_c + F_b d_b$$

Because each AMA 62B,62C generates one-half T and $d_b$ is equal to $d_c$, $F_b$ is equal to $F_c$ and the AMAs 62B,62C are the same size.

Referring now to FIG. 5B, another alternative configuration provides two pairs of AMAs 62. A first pair includes AMAs 62D and 62E and a second pair includes 62F and 62G. Each pair generates one-half of the torque (T). The AMAs of each pair are preferably configured as described above with respect to the AMAs 62A,62B and/or the AMAs 62B,62C. More specifically, the AMAs of each pair can be offset a different distance from the axis A and sized differently, the AMAs of each pair can be offset an equivalent distance from the axis A and sized equivalently.

The control module 38 regulates operation of the AMAs between the ON and OFF modes according to the EMA control of the present invention. More specifically, when the engine 12 is transitioned to the deactivated mode and the engine speed (RPM) is within a threshold range, the control module 38 transitions the AMAs to the ON mode. For example, if the engine is in the deactivated mode and the engine RPM is greater than a first RPM threshold (RPM$_A$) and is less than a second RPM threshold (RPM$_B$), the AMAs are switched to the ON mode. When in the ON mode, the torque (T) cancels vibrations that would otherwise result from the reduced number of firing cylinders. If the engine is in the deactivated mode and the engine RPM is either less than RPM$_A$ or greater than RPM$_B$, the AMAs are switched to the OFF mode.

Figure 6:
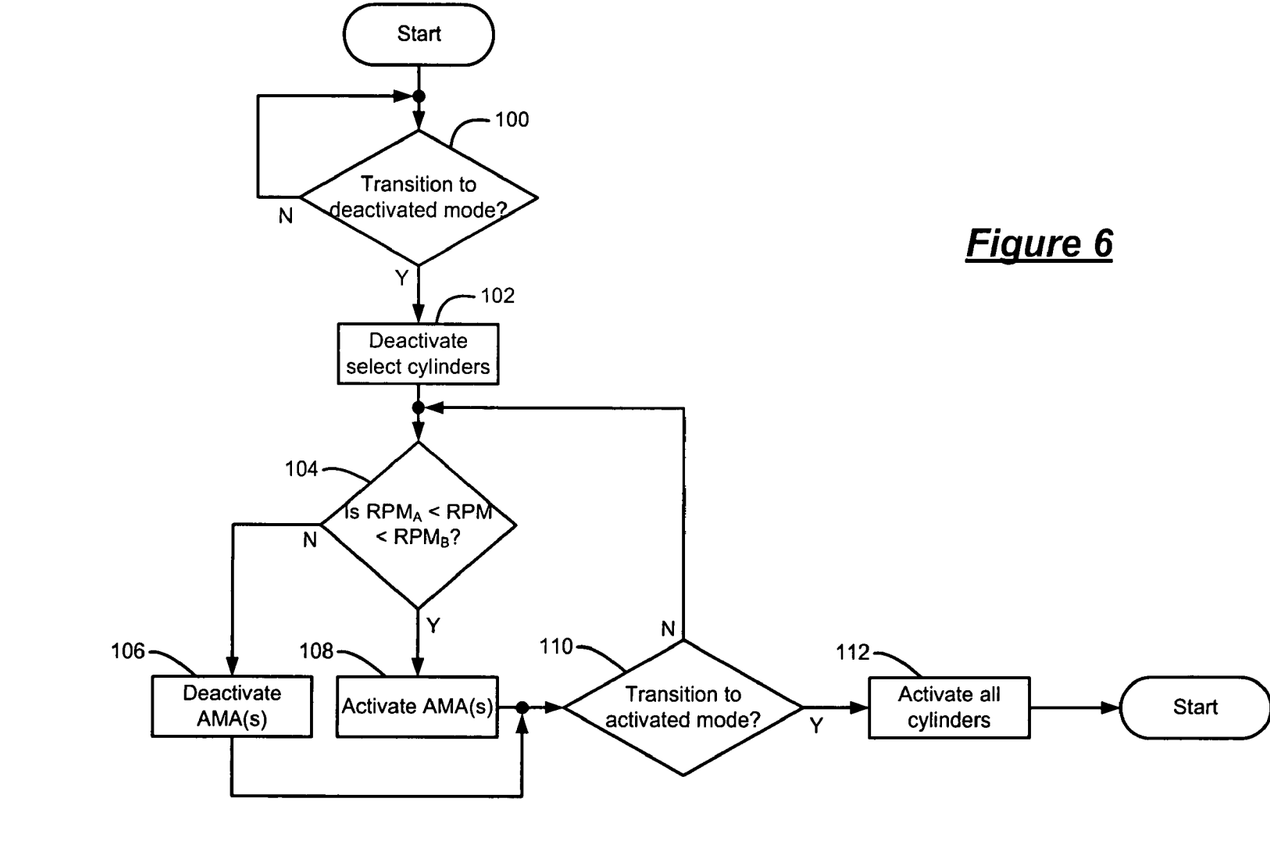
FIG. 6 is a flowchart illustrating exemplary steps executed by the EMA control according to the present invention.

Referring now to FIG. 6, exemplary steps executed by the EMA control of the present invention will be described in detail. In step 100, control determines whether to transition the engine 12 to the deactivated mode based on RPM and MAP. If the engine 12 is not to be transitioned to the deactivated mode, control loops back. If the engine 12 is to be transitioned to the deactivated mode, control deactivates select cylinders 18 in step 102.

In step 104, control determines whether RPM is greater than RPM$_A$ and is less than RPM$_B$. If RPM is not greater than RPM$_A$ and is not less then RPM$_B$, control continues in step 106. If RPM is greater than RPM$_A$ and is less then RPM$_B$, control continues in step 108. In step 106, control deactivates the AMAs (i.e., OFF mode). In step 108, control activates the AMAs (i.e., ON mode). In step 110, control determines whether to transition the engine 12 to the activated mode based on RPM and MAP. If the engine 12 is not to be transitioned to the activated mode, control loops back to step 104. If the engine 12 is to be transitioned to the activated mode, control activates all of the cylinders 18 in step 112 and control ends.

Figure 7:
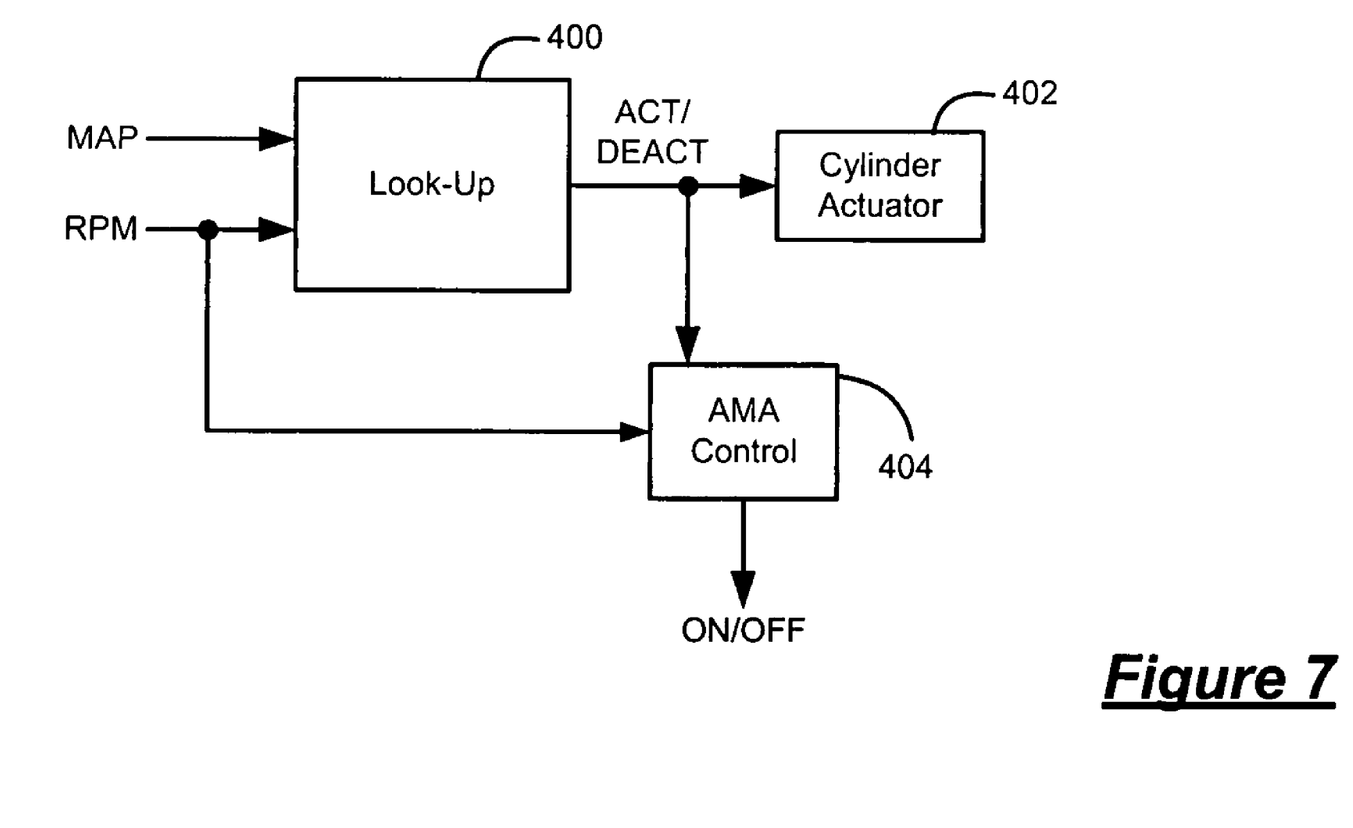
FIG. 7 is a functional block diagram of exemplary modules that execute the EMA control of the present invention

Referring now to FIG. 7, exemplary modules that execute the EMA control will be described in detail. The exemplary modules include a look-up module 400, a cylinder actuator module 402 and an AMA control module 404. The look-up module 400 selectively generates an activate (ACT) or deactivate (DEACT) signal based on RPM and MAP. The cylinder actuator module 402 generates control signals based on the ACT/DEACT signal to selectively activate or deactivate the cylinders 18. The AMA control module 404 generates an AMA ON/OFF signal based on RPM and the ACT/DEACT signal. More specifically, when the DEACT signal is present and RPM is greater than RPM$_A$ and is less than RPM$_B$, the AMA control module 404 generates the OFF signal.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine active motion control system for controlling engine dynamic torque, comprising:
   an engine that generates a first dynamic torque; and
   a first module that selectively initiates generation of a second dynamic torque about an axis of rotation of a crankshaft of said engine in a direction opposite that of said first dynamic torque generated through said crankshaft, wherein said torque is generated when an engine speed is greater than a first engine speed threshold and is less than a second engine speed threshold.

2. The engine active motion control system of claim 1 further comprising a first pair of active mass absorbers (AMAs) that are offset from said axis of rotation and that each generate a force in a direction that is parallel to a plane defined through said axis of rotation to induce said torque.

3. The engine active motion control system of claim 2 wherein said AMAs are positioned on opposite sides of said axis of rotation and are offset an equivalent distance from said axis of rotation.

4. The engine active motion control system of claim 2 wherein said AMAs are positioned on opposite sides of said axis of rotation, are offset at different distances from said axis of rotation, wherein a force generated by one of said first pair of AMAs is greater than a force generated by another of said first pair of said AMAs.

5. The engine active motion control system of claim 2 further comprising a second pair of AMAs that are offset from said axis of rotation and that each generate a force in a direction that is parallel to a plane defined through said axis of rotation to induce said torque.

6. The engine active motion control system of claim 1 wherein said engine is a displacement on demand engine that is operable in activated and deactivated modes.

7. A method for controlling engine operation during activated and deactivated modes in a displacement on demand engine, comprising:
   transitioning said engine to said deactivated mode; and selectively generating a torque about an axis of rotation of a crankshaft of said engine in a direction opposite that of a drive torque generated through said crankshaft, wherein said torque is generated when an engine speed is greater than a first engine speed threshold and is less than a second engine speed threshold.

8. The method of claim 7 further comprising providing a first pair of active mass absorbers (AMAs) that are offset from said axis of rotation and that each generate a force in a direction that is parallel to a plane defined through said axis of rotation to induce said torque.

9. The method of claim 8 wherein said AMAs are positioned on opposite sides of said axis of rotation and are offset an equivalent distance from said axis of rotation.

10. The method of claim 8 wherein said AMAs are positioned on opposite sides of said axis of rotation, are offset at different distances from said axis of rotation, wherein a force generated by one of said first pair of AMAs is greater than a force generated by another of said first pair of said AMAs.

11. The method of claim 8 further comprising providing a second pair of AMAs that are offset from said axis of rotation and that each generate a force in a direction that is parallel to a plane defined through said axis of rotation to induce said torque.

12. A method of reducing engine vibration during a deactivated mode of a displacement on demand engine, comprising:
   determining whether to transition said engine to said deactivated mode;
   monitoring an engine speed; and
   activating an active mass absorber (AMA) based on said engine speed to generate a torque about an axis of rotation of a crankshaft of said engine in a direction opposite that of a drive torque generated through said crankshaft, wherein said torque is generated when said engine speed is greater than a first engine speed threshold and is less than a second engine speed threshold.

13. The method of claim 12 further comprising providing a first pair of active mass absorbers (AMAs) that are offset from said axis of rotation and that each generate a force in a direction that is parallel to a plane defined through said axis of rotation to induce said torque.

14. The method of claim 13 wherein said AMAs are positioned on opposite sides of said axis of rotation and are offset an equivalent distance from said axis of rotation.

15. The method of claim 13 wherein said AMAs are positioned on opposite sides of said axis of rotation, are offset at different distances from said axis of rotation, wherein a force generated by one of said first pair of AMAs is greater than a force generated by another of said first pair of said AMAs.

16. The method of claim 13 further comprising providing a second pair of AMAs that are offset from said axis of rotation and that each generate a force in a direction that is parallel to a plane defined through said axis of rotation to induce said torque.

* * * * *